United States Patent [19]
Mohri et al.

[11] Patent Number: 5,162,713
[45] Date of Patent: Nov. 10, 1992

[54] STRUCTURAL ERROR CORRECTION METHOD FOR SCARA ROBOT

[75] Inventors: Shunji Mohri; Akira Miyakawa, both of Kanagawa, Japan

[73] Assignee: Hitachi, Ltd., Tokyo, Japan

[21] Appl. No.: 599,020

[22] Filed: Oct. 17, 1990

[30] Foreign Application Priority Data

Oct. 20, 1989 [JP] Japan .................................. 1-271873

[51] Int. Cl.⁵ ............................................ G05B 11/18
[52] U.S. Cl. ........................... 318/568.19; 318/568.22; 901/9; 901/15
[58] Field of Search .............. 318/569, 568.11, 568.19, 318/568.2, 568.22, 572, 574, 56; 901/2, 14–16, 19, 23–25, 9

[56] References Cited

U.S. PATENT DOCUMENTS

| | | | |
|---|---|---|---|
| 4,488,242 | 12/1984 | Tabata et al. | 318/568.22 |
| 4,600,869 | 7/1986 | Sekine et al. | 318/568.19 |
| 4,725,965 | 2/1988 | Keenan | 901/15 |
| 4,955,250 | 9/1990 | Fisher | 901/9 |

Primary Examiner—William M. Shoop, Jr.
Assistant Examiner—John W. Cabeca
Attorney, Agent, or Firm—Antonelli, Terry, Stout & Kraus

[57] ABSTRACT

An origin of a robot coordinate system is determined exactly as a center of a circular arc described by actuating a first axis only thereof and marking at least three points on a horizontally arranged sheet, at which an origin of an absolute coordinate system is set. In order to obtain the relationship between two coordinate system, making the both origin coincide with each other, then two y axis symmetrical points are measured to determine y axis. Then another two points are measured to obtain structural errors. Using structural errors, compensation of a numerical instructed point is carried out to make the robot position with high accuracy. Further, in order to remove backlash of the driving system, an intermediate point is set on a route toward a certain positioning point so that the driving system always rotates in one direction by some amount when moved to the final, aimed point.

2 Claims, 8 Drawing Sheets

O''-x'', y''---TEMPORARY COORDINATE SYSTEM

O-x, y---ROBOT COORDINATE SYSTEM

191 — GIVE NUMERICAL INSTRUCTION (x, y)

192 —
$$\tan \alpha = \frac{y}{x}$$
$$r = \sqrt{x^2 + y^2}$$
$$\cos(\theta_1^* - \alpha + \Delta\theta_1) = \frac{r^2 + (\ell_1 + \Delta\ell_1)^2 - (\ell_2 + \Delta\ell_2)^2}{2r(\ell_1 + \Delta\ell_1)}$$
$$\tan(\theta_2^* - \alpha + \Delta\theta_2) = \frac{-(\ell_1 + \Delta\ell_1)\sin(\theta_1^* - \alpha + \Delta\theta_1)}{r - (\ell_1 + \Delta\ell_1)\cos(\theta_1^* - \alpha + \Delta\theta_1)}$$

STRUCTURAL ERROR CORRECTION METHOD FOR SCARA ROBOT

BACKGROUND OF THE INVENTION

The present invention relates to a method of correcting various structural errors of a SCARA robot which may be produced in machining parts thereof, assembling the parts and/or installing a SCARA robot and, particularly, to a structural error correction method for a SCARA robot suitable to position arms thereof in a numerically . instructed position with a high absolute accuracy.

A conventional error correction method for a SCARA robot is disclosed in N. Furuya et al., "Correction of Parameters of SCARA Robot by Teaching", Seimitsu-Kikai, vol. 49, No. 9, (September 1983), pages 1223 to 1228, in which a correction is made by obtaining a length of a robot arm and a mounting angle thereof by measuring three points on a straight line or four points constituting a four-cornered area by touching by a finger of the robot arm.

In the conventional method mentioned above, in order to obtain structural errors of a robot, two different coordinates values are necessary, namely, a coordinates value in an absolute coordinate system having an origin in a certain position after installing the robot and also a coordinates value in the robot coordinate system having an origin at a position in which the robot is installed. However, it is very difficult to perform positional measurements on such an absolute coordinate system.

SUMMARY OF THE INVENTION

An object of the present invention is to provide a structural error correction method for a SCARA robot having at least three axes, in which a geometrical absolute position can be obtained with simplified measurement by rotating only a first axis of the robot arms thereof to describe a circular arc to thereby make an origin of the robot coordinate system coincident with an origin of an absolute coordinate system and in which, in addition thereto, an error of a vertical, third axis can be determined and suitably obtaining a position of a rotation center of a second axis and a measuring method to remove backlash error of a robot driving system.

In order to achieve the above object, according to the present invention, an origin of the SCARA robot coordinate system is determined exactly and an origin of the absolute coordinate system (a coordinate system of the measuring instrument) is set at the origin of the robot coordinate system thus obtained.

In the present invention, the origin of the robot coordinate system is obtained as a center of a circular arc or a circle obtained by actuating of a first axis of the robot arms thereof. Further, in order to remove backlash of the driving systems, an intermediate point is set on a route toward a certain positioning point and the robot is always positioned once at the intermediate point so that the driving systems rotate in one direction when the robot moves to the final, aimed point via the fixed point.

The origin of the absolute coordinate system may be at any point and the origin of the robot coordinate system is exactly determined by the rotation center of the arc. Therefore, by making the origin of the absolute coordinate system coincident with the origin of the robot coordinate system, the absolute position measurement is simplified.

DETAILED DESCRIPTION OF THE PREFERRED EMBODIMENT

Figure 1:
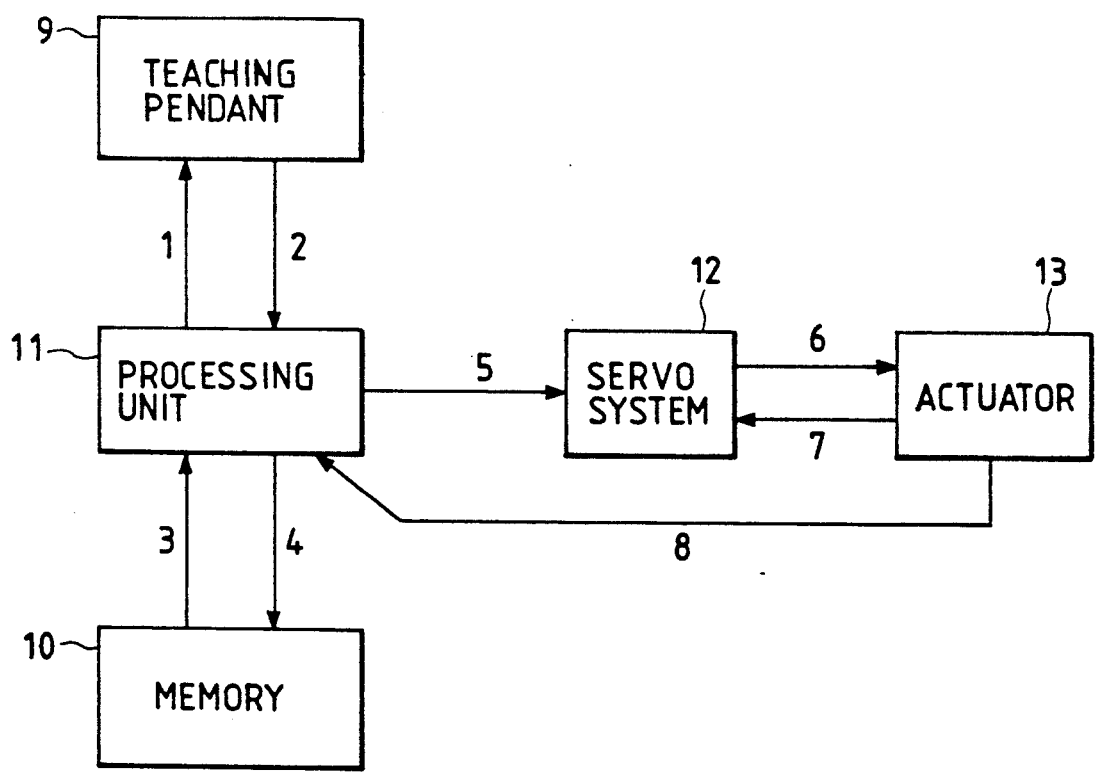
FIG. 1 is a block diagram of a robot control system showing an embodiment of an error correction method for a SCARA type robot structural parameters according to the present invention.

In the control system of FIG. 1, an instruction signal 1, indicative of such as display data, etc., is supplied from a processing unit 11 to a teaching pendant 9 and an instruction signal 2 indicative of such as amount of shift and its direction, etc., is sent from the teaching pendant 9 to the operation device 11. Teaching data 3 is supplied from a memory 10 to the processing unit 11 from which teaching data 4 is inputted to the memory 10. From the processing unit 11, a servo instruction signal 5 are supplied to an a servo system 12 from which instruction signals 6 is sent to actuator 13 of a robot. From the actuators 13, a feedback signal 7 is given to the servo system 12. A signal 8 indicative of an current position of the actuator 13 is sent to the processing unit 11. The current position signal 8 may be a train of pulses generated by an encoder mounted on a motor of the actuator 13.

Figure 2:
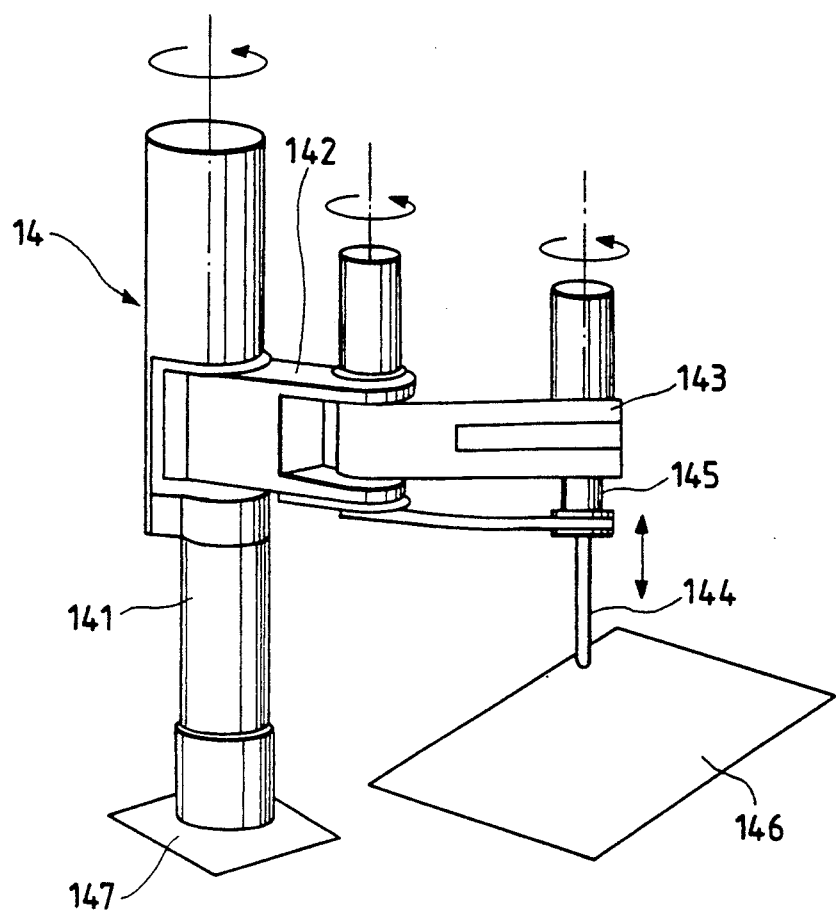
FIG. 2 is a perspective view of a SCARA robot to which the method shown in FIG. 1 is applicable.

FIG. 2 is a perspective view of a SCARA robot. In As shown in FIG. 2, the robot 14 includes a first axis 141 supporting a first arm 142 rotatably around the first axis, a second arm 143 supported by the first arm 142 rotatably around a second axis, a vertical axis 144 supported vertically movably by the second arm 143 along a third axis, a wrist axis 145 and a installing plate 147. A measuring paper sheet 146 is also shown.

To measure structural errors of the robot 14 shown in FIG. 2, the measuring paper sheet 146 is positioned in a plane parallel to a installing surface of the setting plate 147 of the robot within a movable range of the robot arms. When the robot 14 is to be set on a horizontal plane, it is possible to set the paper sheet 146 exactly by using a leveling instrument. It may be possible to regulate the paper sheet 146 such that z coordinate values of the vertical axis 144, at several points at which the vertical axis shaft 144 when lowered contacts the paper sheet are all equal with each other. Then, a pen mounted on a top of the vertical axis 144 is lowered by using the teaching pendant 9 shown in FIG. 1 until the pen contacts the paper sheet 146, with these operations being called a "pointing operation".

Figure 3:
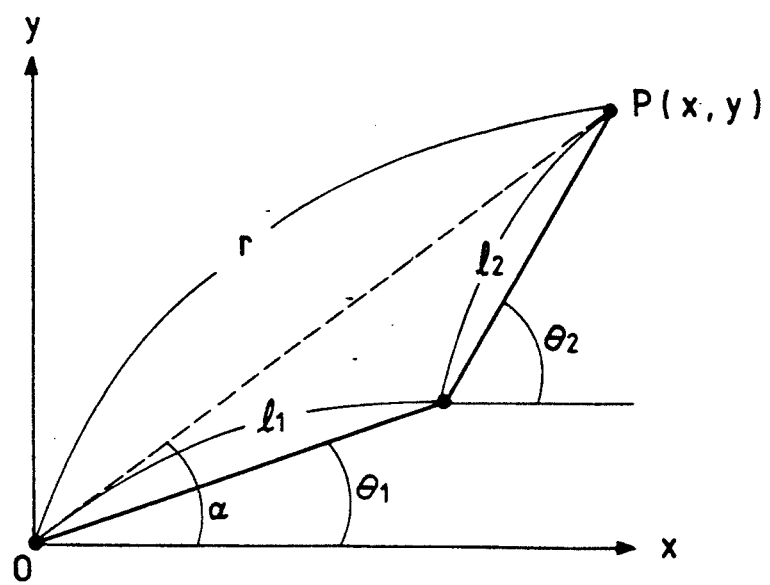
FIG. 3 is a graphical illustration defining parameters of the SCARA robot in FIG. 2.

In the graph of FIG. 3, a letter O is an origin of the robot coordinate system, x and y are coordinate axes of the robot coordinate system, $l_1$ is a length of the first arm 142, $l_2$ is a length of the second arm 143, $\theta_1$ is a first angle of the first arm 142 with respect to x axis, $\theta_2$ is a second angle of the second arm 143 with respect to x axis, $P(x,y)$ is a position of the top of the second arm 143, r is a distance from the origin O to the position $P(x,y)$ and $\alpha$ is an angle between x axis and a straight line connecting the position $P(x,y)$ and the origin O. These parameters determine the specification of the robot 14. From FIG. 3, it is clear that the position $P(x,y)$ of the top of the second arm 143 of the robot 14 can be obtained by changing $\theta_1$ and $\theta_2$. Structural errors of the robot 14 include:

(1) arm length errors: $\Delta l_1$ and $\Delta l_2$ (2) arm mounting angle errors: $\Delta\theta_1$ and $\Delta\theta_2$ Although there may be errors in directions apart from the horizontal plane, such error is ignored here for simplicity of explanation with an assumption that the robot has an enough rigidity in such direction and is assembled with high precision.

Thus, the finger position $P(x,y)$ can be represented as follow:

$$x = l_1 \cos\theta_1 + l_2 \cos\theta_2$$

$$y = l_1 \sin\theta_1 + l_2 \sin\theta_2 \quad (1)$$

Due to structural errors, the finger position may be represented by $P'(x',y')$ where $$x' = (l_1 + \Delta l_1)\cos(\theta_1 + \Delta\theta_1) + (l_2 + \Delta l_2)\cos(\theta_2 + \Delta\theta_2)$$

$$x' = (l_1 + \Delta l_1)\sin(\theta_1 + \Delta\theta_1) + (l_2 + \Delta l_2)\sin(\theta_2 + \Delta\theta_2) \quad (2)$$

By representing differences between the equations (1) and (2) as $$\Delta x = x' - x$$

$$\Delta y = y' - y \quad (3)$$

and assuming differences $\Delta l_1$, $\Delta l_2$, $\Delta\theta_1$ and $\Delta\theta_2$ are very small respectively, the relationship are obtained:

$$\Delta x = \cos\theta_1 \Delta l_1 - l_1\sin\theta_1\Delta\theta_1 + \cos\theta_2\Delta l_2 - l_2\sin\theta_2\Delta\theta_2$$

$$\Delta y = \sin\theta_1 \Delta l_1 - l_1\cos\theta_1\Delta\theta_1 + \sin\theta_2\Delta l_2 - l_2\cos\theta_2\Delta\theta_2 \quad (4)$$

From the equation (4), the following matrix representation is obtained:

$$\begin{pmatrix}\Delta x \\ \Delta y\end{pmatrix} = \begin{pmatrix}\cos\theta_1 & \cos\theta_2 & -l_1\sin\theta_1 & -l_2\sin\theta_2 \\ \sin\theta_1 & \sin\theta_2 & l_1\cos\theta_1 & l_2\cos\theta_2\end{pmatrix}\begin{pmatrix}\Delta l_1 \\ \Delta l_2 \\ \Delta\theta_1 \\ \Delta\theta_2\end{pmatrix} \quad (5)$$

Therefore, by measuring differences $\Delta_1$, $\Delta_1$, $\Delta_2$ and $\Delta_2$ between two different points $P(\theta_{11}, \theta_{21})$ and $P(\theta_{12}, \theta_{22})$ and solving the following matrix:

$$\begin{pmatrix}\Delta x_1 \\ \Delta y_1 \\ \Delta x_2 \\ \Delta y_2\end{pmatrix} = \begin{pmatrix}\cos\theta_{11} & \cos\theta_{21} & -l_1\sin\theta_{11} & -l_2\sin\theta_{21} \\ \sin\theta_{11} & \sin\theta_{21} & l_1\cos\theta_{11} & l_2\cos\theta_{21} \\ \cos\theta_{12} & \cos\theta_{22} & -l_2\sin\theta_{12} & -l_2\sin\theta_{22} \\ \sin\theta_{12} & \cos\theta_{22} & l_1\cos\theta_{21} & l_2\cos\theta_{22}\end{pmatrix}\begin{pmatrix}\Delta l_1 \\ \Delta l_2 \\ \Delta\theta_1 \\ \Delta\theta_2\end{pmatrix} \quad (6)$$

mechanism errors $\Delta l_1$, $\Delta l_2$, $\Delta\theta_1$ and $\Delta\theta_2$ can be obtained.

In obtaining these mechanism errors, the measuring method for measuring differences $\Delta x$ and $\Delta y$ of the finger position $P(x,y)$ of the robot 14 is very important. That is, coordinates value $(x,y)$ in the robot coordinate system O-x,y and coordinates value $(x',y')$ in the absolute coordinate system must be measured. Coordinates value $(x,y)$ of the robot coordinate system can be known as an aimed value calculated in the control system of the robot shown in FIG. 1 since it is an internal instruction value of the robot 14. However, coordinates value $(x',y')$ of the absolute coordinate systems must be measured. The absolute coordinate system O'-x',y' in measuring this coordinates value $(x',y')$ can be set at any point provided that a relation thereof to the robot coordinate system O-x, y is known. According to the present invention, the measurement of differences $\Delta x$ and $\Delta y$ of the coordinates values and calculations of structural errors $\Delta l_1$, $\Delta l_2$, $\Delta\theta_1$ and $\Delta\theta_2$ can be simplified by making robot the coordinate system O-x,y coincident with the absolute coordinate system O'-x',y'. The measurement of positioning point and the calculation of structural errors will be described in detail with reference to a flowchart shown in FIG. 4.

Figure 4:
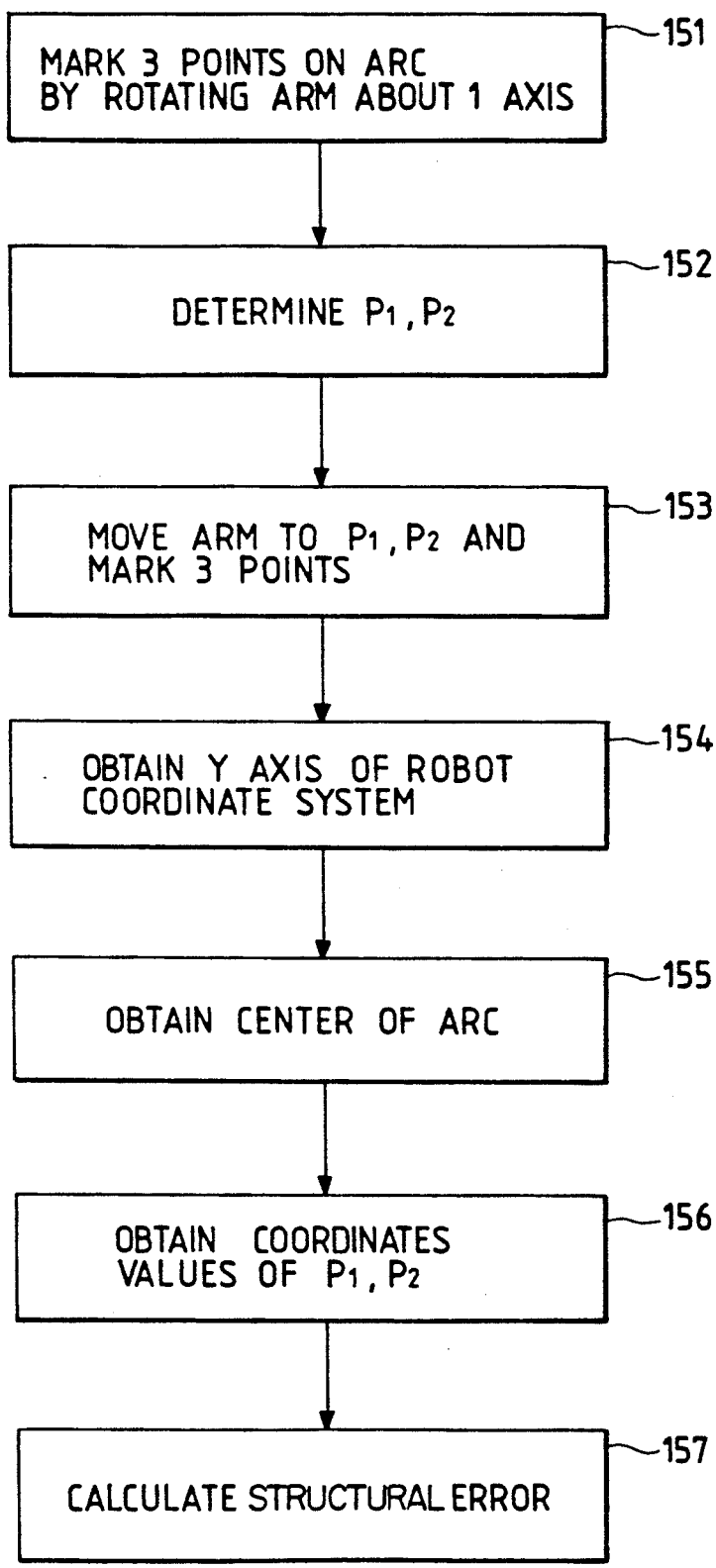
FIG. 4 is a flowchart of the method for obtaining a structural according to the system shown in FIG. 1.

As shown in the flow chart of FIG. 4 in step 151, the vertical shaft 144 is lowered at least three times by using the teaching pendant 9 while the first axis 141 of the robot 14 is moved to describe an arc to mark at least three points on the paper sheet 146. The origin O of the robot coordinate system x,y is obtained as a center of the arc defined by these points. Such function as moving the arms around only one axis is usually given to any robot. It should be noted that an orientation and position of the robot is not important so long as at least three points are marked on the paper sheet 146 arranged in parallel to the setting plate 147 of the robot 14.

Figure 5:
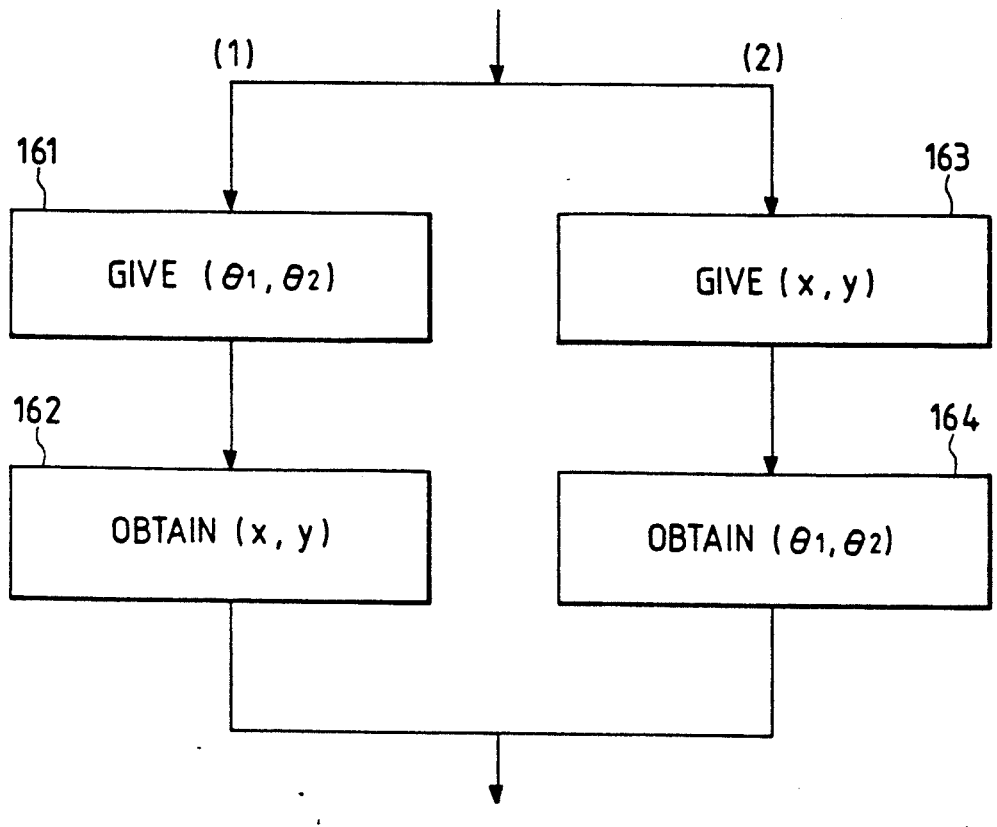
FIG. 5 is a flowchart for obtaining a measuring point of structural error in FIG. 4.

In the next step 152, different two points $P1(x1,y1)$ and $P2(x2,y2)$ are determined and internal instruction values $(\theta_{11}, \theta_{21})$ and $(\theta_{12}, \theta_{22})$ thereof are obtained. These different points P1 and P2 have preferably substantially different orientations from each other. That is, these points P1 and P2 should not be set on a straight line extending from the rotation center O or these should not be set on a circle having its center coincides with the rotation center O. The points P1 and P2 may be set by either one of two methods (1) and (2) which are shown in FIG. 5. That is, FIG. 5 is a detailed flowchart corresponding to the step 152 in FIG. 4. According to the first method (1), $(\theta_1, \theta_2)$ is given first in the step 161 and then (x,y) is obtained using the equation (1) in the step 162. According to the second method (2), (x,y) is given first in the step 163 and then ($\theta_1$, $\theta_2$) is obtained in the step 164 in the following manner: Using $$\tan \alpha = y/x \text{ (if } x = 0, \text{ then } \alpha = 90°)$$

$$\gamma = \sqrt{x^2 + y^2}$$

in FIG. 3, coordinate transformation $$\cos(\theta_1 - \alpha) = (\gamma^2 + l_1^2 - l_2^2)/(2\gamma l_1)$$

$$\tan(\theta_2 - \alpha) = -[l_1 \sin(\theta_1 - \alpha)]/[\gamma - l_1 \cos(\theta_1 - \alpha)] \quad (7)$$

is performed to obtain ($\theta_1$, $\theta_2$).

The points P1 and P2 may be points taught. In such case, ($\theta_1$, $\theta_2$) or (x,y) may be obtained from teaching data of P1 and P2.

Figure 6:
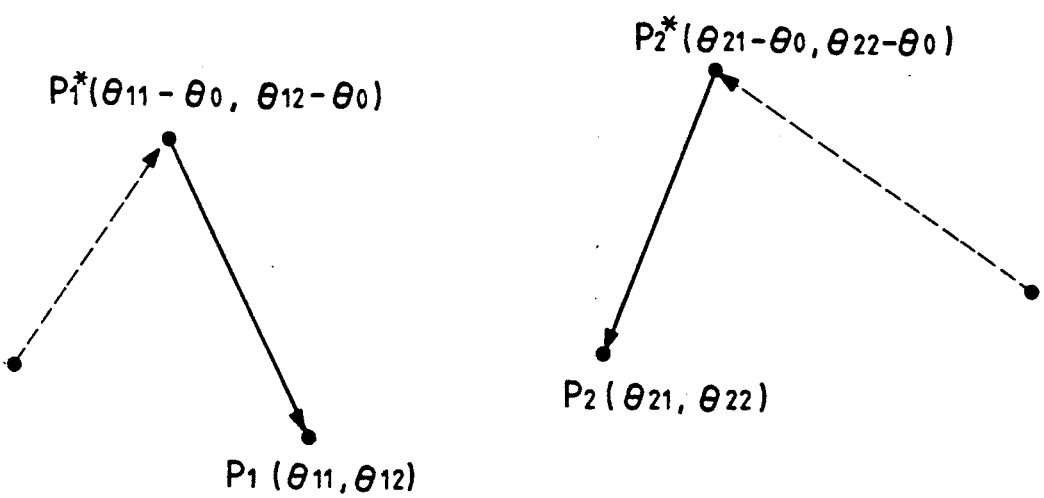
FIG. 6 is a graph for explanation of a fixed point to be set on a route to a final point.

In the step 153 in FIG. 4, the finger is moved to the points P1 and P2 and these points are marked on the paper sheet 146. Such movement of the finger to the points P1 and P2 is preferably performed through intermediate points such as shown in FIG. 6. In FIG. 6, the intermediate points P1* and P2* are obtained and the finger is once moved to these intermediate points P1* and P2* to the points P1 and P2, respectively. The intermediate points P1* and P2* are obtained by setting a certain angle $\theta_0$ (in the order of 3° to 10°) and setting them as follows:

$$P1^* = P1^* (\theta_{11} - \theta_0, \theta_{12} - \theta_0)$$

$$P2^* = P2^* (\theta_{21} - \theta_0, \theta_{22} - \theta_0) \quad (8)$$

That is, when the finger is moved from the respective intermediate points P1* and P2* to the final positions P1($\theta_{11}$, $\theta_{12}$) and P($\theta_{21}$, $\theta_{22}$), the respective articulations are moved in the same direction by the same angle $\theta_0$. Therefore, backlash of the driving system is removed.

It may be considered that the points P1 and P2 are offset from the vertical axis 144. If it is the case, such offset should be corrected. In order to correct such offset, the pointing operation is not performed immediately after the finger reaches these points P1 and P2. That is, when the finger reaches these points, the wrist axis 145 is rotated and pointing operation is performed to obtain

P11, P12, P13
P21, P22, P23 on the paper sheet 146. The points P1 and P2 are obtained as centers of arcs defined by the above two pairs of three points.

In the step 154, a pair of points P3 and P4 which are line-symmetry with respect to y axis are determined and a perpendicular bisector of a line segment connecting the points P3 and P4 or a straight line connecting a center of the line segment to an origin 0 of the robot coordinates system, which is to be obtained in the next step 155, is determined as y axis of the robot coordinates system. This can be done easily if the robot has a mirror function.

Figure 7:
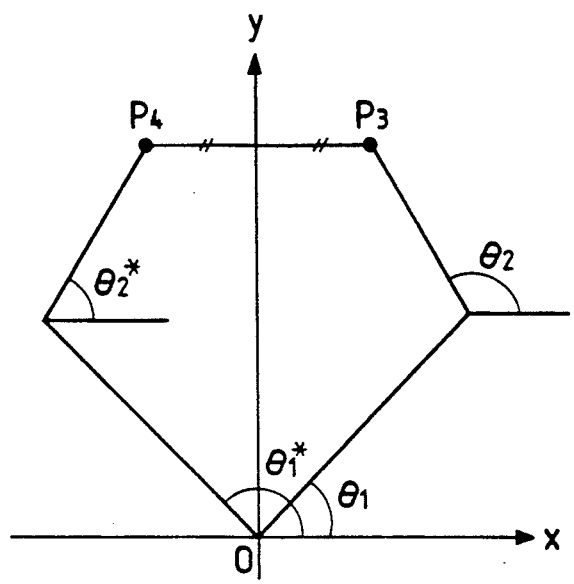
FIG. 7 is a graph explaining axis symmetrical points in FIG. 4.
Figure 8:
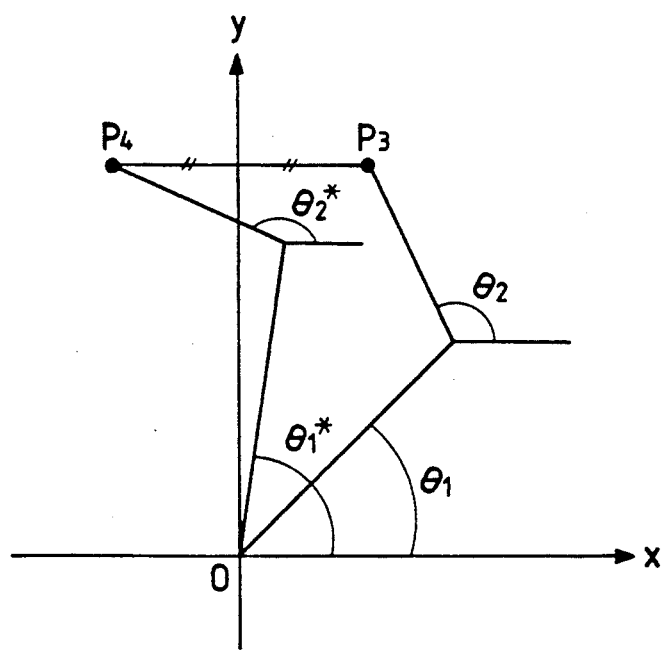
FIG. 8 is a graph explaining axis symmetrical points in FIG. 4 in another way.

For a robot having no mirror function, FIG. 7 is referenced which explains the axis symmetry points described with reference to the step 154 in FIG. 4. In FIG. 7, it is enough to set points ($\theta_1$, $\theta_2$) and ($\theta_1^*$, $\theta_2^*$) defined by $$\theta_1^* = 180° - \theta_1$$

$$\theta_2^* = 180° - \theta_2 \quad (9)$$

as the points P3 and P4, respectively. In a case where a robot in question can use only a righthand system or a lefthand system, the axis symmetrical points P3 and P4 can be determined as shown in FIG. 8. In FIG. 8, ($\theta_1$, $\theta_2$) and ($\theta_1^*$, $\theta_2^*$) which are defined by $$\theta_1^* = 180° - \theta_2$$

$$\theta_2^* = 180° - \theta_1 \quad (10)$$

are set as the points P3 and P4, respectively.

The intermediate points shown by the equation (8) are also effectively used for the points P3 and P4 to make the points accurate.

Figure 9A:
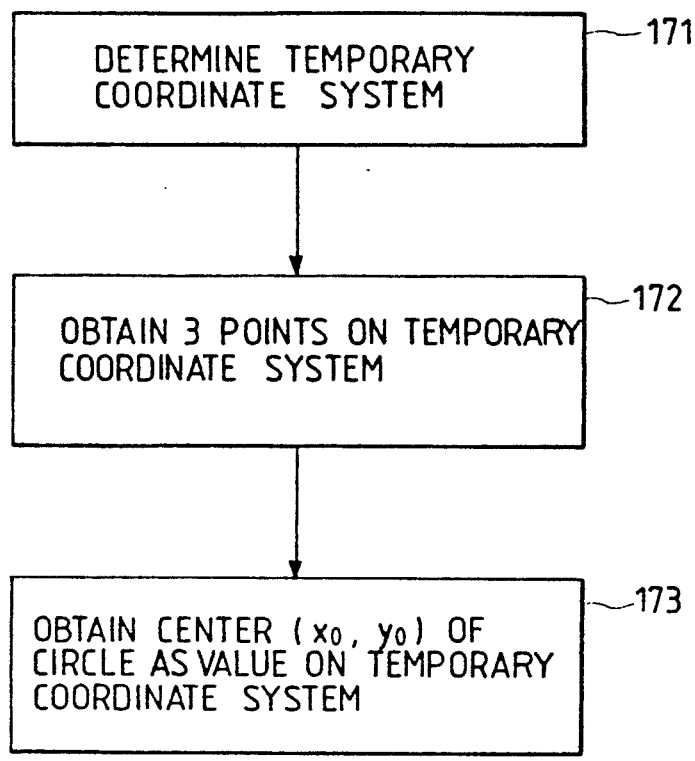
FIG. 9A is a flowchart for obtaining a center of a circular arc in FIG. 4.
Figure 9B:
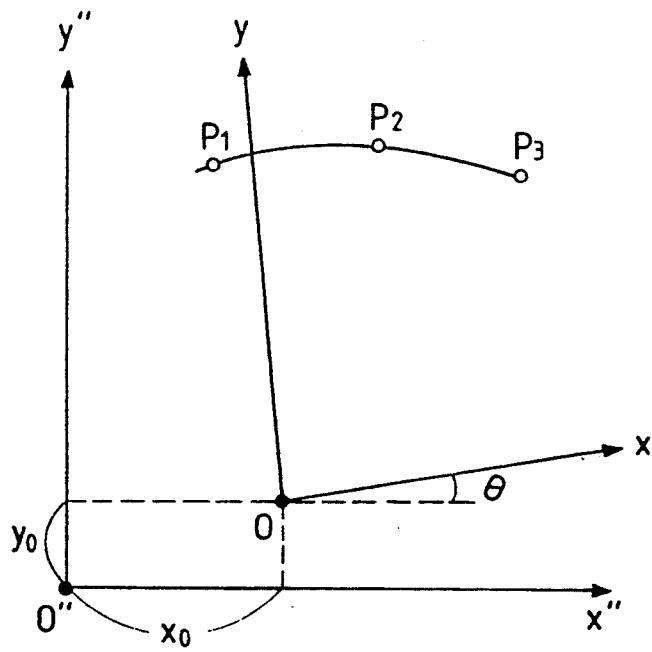
FIG. 9B is an explanatory drawing for explaining the flowchart in FIG. 9A.

In the step 155, the origin O of the robot coordinate system O-x,y is obtained from the points on the circular arc obtained in the step 151. FIGS. 9a and 9b show how to obtain the origin O of the robot coordinates system from the arbitrarily determined three points on the arc.

In FIGS. 9a and 9b, a temporary coordinate systems O''-x'',y'' is determined (step 171) and, then, coordinates values of the points P1, P2 and P3 on a circular arc are measured in the temporary coordinates system (step 172). A center O($x_0$, $y_0$) of the circular arc in the temporary coordinate system is obtained and is set as the origin of the robot coordinate system (step 173).

In the step 156, coordinates values ($x_1'$, $y_1'$) and ($x_2'$, $y_2'$) of the points P1($\theta_{11}$, $\theta_{12}$) and P2($\theta_{21}$, $\theta_{22}$) marked in the step 153 in the robot coordinate system O-x,y obtained in the steps 154 and 155 are obtained in either one of the following two methods. In the first method (1), these coordinates values ($x_1''$, $y_1''$) and ($x_2''$, $y_2''$) are directly obtained from the robot coordinates system O-x,y obtained in the steps 154 and 155 and, in the second method (2), the coordinates value P1($x_1'$, $y_1'$) is obtained by measuring coordinates values of the points P1 and P2 on the temporary coordinate systems O''-x'',y'' in FIG. 9B, determined in the step 155 in FIG. 4 and coordinates-transforming the measured coordinates value ($x_1''$, $y_1''$) according to the following equation (11):

$$\begin{pmatrix} x_1' \\ y_1' \end{pmatrix} = \begin{pmatrix} \cos\theta & \sin\theta \\ -\sin\theta & \cos\theta \end{pmatrix} \begin{pmatrix} x_1'' \\ y_1'' \end{pmatrix} - \begin{pmatrix} x_0 \\ y_0 \end{pmatrix} \quad (11)$$

where $\theta$, $x_0$ and $y_0$ are defined as shown in FIG. 9B.

In the step 157, mechanism errors $\Delta l_1$, $\Delta l_2$, $\Delta\theta_1$ and $\Delta\theta_2$ are calculated by incorporating the coordinates values ($\theta x_1$, $y_1$), ($x_2$, $y_2$), ($\theta_{11}$, $\theta_{12}$), ($\theta_{21}$, $\theta_{22}$), ($x_1'$, $y_1'$) and ($x_2'$, $y_2'$) to the equation (6). This calculation can be done easily by obtaining inverse matrix of the coefficient matrix according to the equation (6). The method of obtaining the inverse matrix is well known.

By making the robot coordinate system O-x,y coincident with the absolute coordinate system O'-x',y', measurement and structural error calculation are remarkably simplified.

Figure 10:
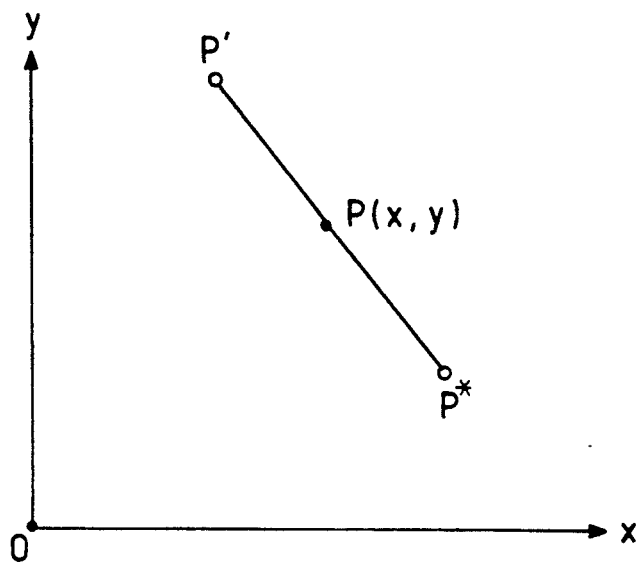
FIG. 10 illustrates a relation between an instructed numerical position in FIG. 1 and an aimed position after corrected.

A control of robot by correcting structural errors thereof obtained in this manner will be described with reference to FIG. 10 which shows a relation of the instructed position in FIG. 1 to the aimed position obtained after correction of structural errors. In FIG. 10, it is clear that, if the numerical instruction position P(x,y) in robot coordinate system O-x,y were used as an aimed point, the robot finger might be moved to a point P' due to structural errors. Therefore, in order to correct the robot finger by the structural error control system of the robot 14, point P* (x*, y*) is determined from the instructed position P(x,y) as a vertual point after the correction of structural errors, according to the following equation:

$$P^* = \begin{pmatrix} x^* \\ y^* \end{pmatrix} = \begin{pmatrix} (l_1 - \Delta l_1)\cos(\theta_1 - \Delta\theta_1) + (l_2 - \Delta l_2)\cos(\theta_2 - \Delta\theta_2) \\ (l_1 - \Delta l_1)\sin(\theta_1 - \Delta\theta_1) + (l_2 - \Delta l_2)\cos(\theta_2 - \Delta\theta_2) \end{pmatrix} \quad (12)$$

The correction method for structural errors will be described in detail with reference to FIGS. 11 and 12 which show flowcharts of different methods for obtaining the aimed position after the structural error correction.

Figure 11:
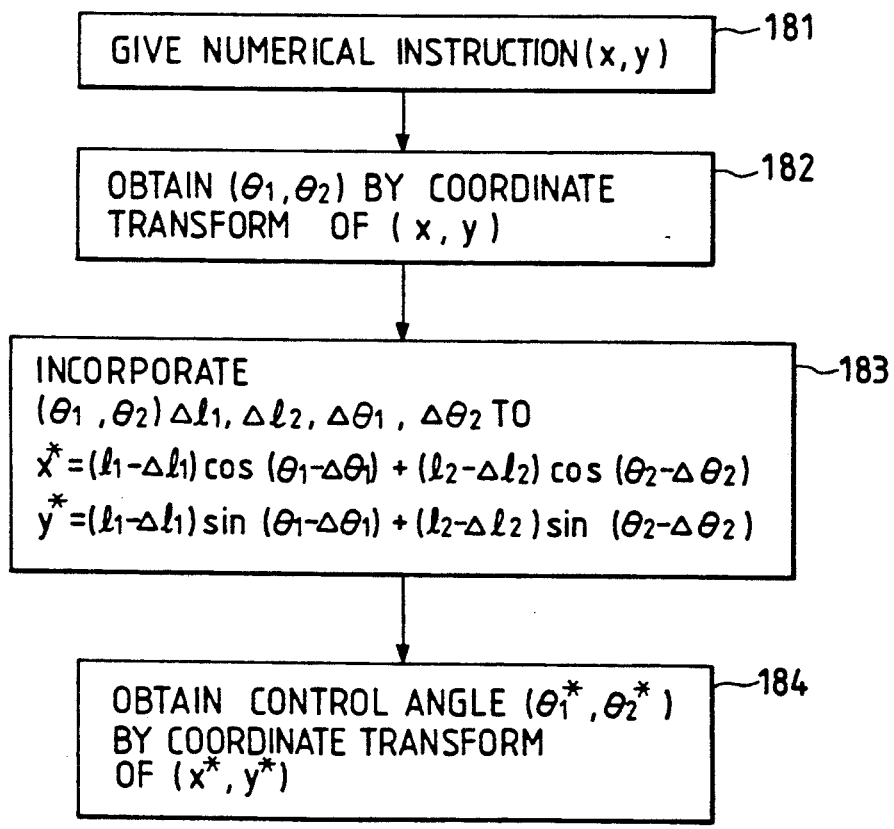
FIG. 11 is a flowchart for a method of obtaining the aimed position after correction.

The flow chart in FIG. 11 is effective when an equation containing structural errors can not be solved easily with respect to $(\theta_1, \theta_2)$. In FIG. 11, a numerical instruction (x,y) is given (step 181) and a control angle $(\theta_1, \theta_2)$ thereof is obtained from the instruction (x,y) using the equation (7) of coordinates-transformation (step 182). Then, the aimed point (x*,y*) is obtained according to the equation (13) by taking the control angle $(\theta_1, \theta_2)$ and structural errors $\Delta l_1$, $\Delta l_2$, $\Delta\theta_1$ and $\Delta\theta_2$ into consideration (step 183) and, then, from thus obtained ( x*, y*), the control angle $(\theta_1^*, \theta_2^*)$ is obtained using the coordinate-transaformation equation (7) again (step 184).

Figure 12:
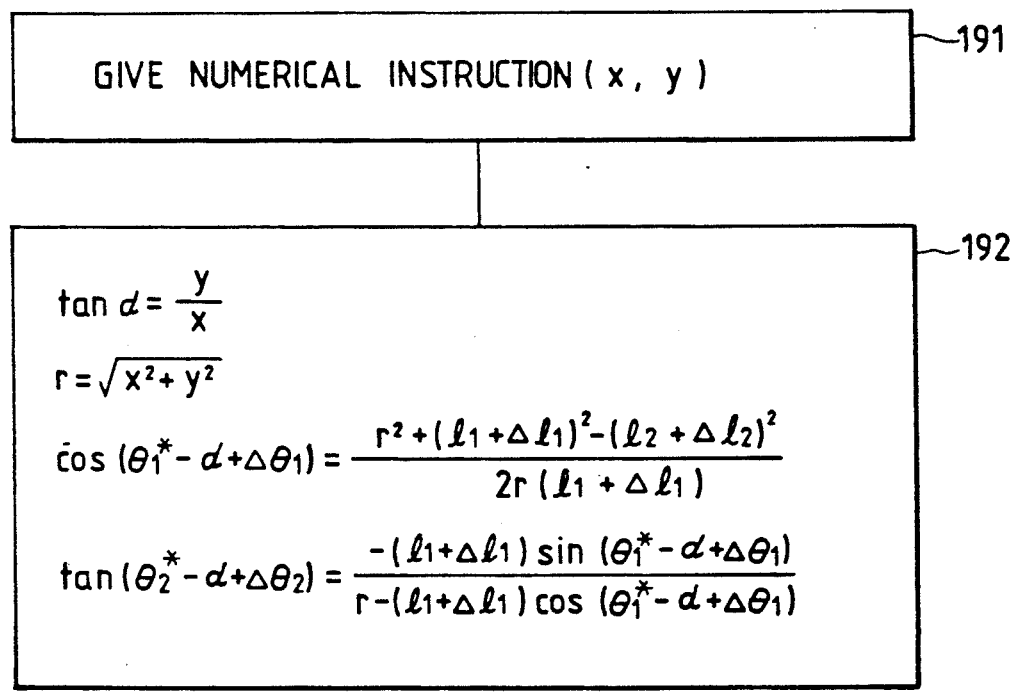
FIG. 12 is a flowchart for another method of obtaining the aimed position after correction.

In FIG. 12 showing another method of obtaining the control angle $(\theta_1^*, \theta_2^*)$, which is effective when an equation containing structural errors can be easily solved with respect to $(\theta_1, \theta_2)$, the numerical instruction (x,y) is given in the step 191 as in the step 181 in FIG. 11 and, then, the control angle $(\theta_1^*, \theta_2^*)$ is directly obtained in the step 192 from the instruction (x,y) according to the following equation:

$$\cos(\theta_1^* - \alpha + \Delta\theta_1) = \frac{\gamma^2 + (l_1 + \Delta l_1)^2 - (l_2 + \Delta l_2)^2}{2\gamma(l_1 + \Delta l_1)} \quad (13)$$

$$\tan(\theta_2^* - \alpha + \Delta\theta_2) = \frac{-(l_1 + \Delta l_1)\sin(\theta_1^* - \alpha + \Delta\theta_1)}{\gamma - (l_1 + \Delta l_1)\cos(\theta_1^* - \alpha + \Delta\theta_1)}$$

where $\tan\alpha = y/x$ ($\alpha = 90°$ when $x = 0$)

$$\gamma = \sqrt{x^2 + y^2}$$

The equation (13) can also be used in the step 183 in FIG. 11. That is, $\Delta x$ and $\Delta y$ in the equation (3) are obtained according to the equation (14) and, from thus obtained $\Delta x$ and $\Delta y$, the control angle (x*, y*) can be obtained according to the following equation:

$$x^* = x - \Delta x$$

$$y^* = y - \Delta y \quad (14)$$

In order to improve the accuracy of the method of obtaining the structural errors shown in FIG. 4, it is possible to obtain secondary approximations $\Delta l_1^2$, $\Delta l_2^2$, $\Delta\theta_1^2$ and $\Delta\theta_2^2$ by repeating the steps 152 through 157 by substituting structural errors $\Delta l_1^1$, $\Delta l_2^1$, $\Delta\theta_1^1$ and $\Delta\theta_2^1$ obtained according to the flowchart in FIG. 4 into $l_1 = l_1 + \Delta l_1^1$, $l_2 = l_2 + \Delta l_2^1$ $\theta_1 = \theta_1 + \Delta\theta_1^1$, $\theta_2 = \theta_2 + \Delta\theta_2^1$ so that the following is obtained: $l_1 = l_1 + \Delta l_1^2$, $l_2 = l_2 + \Delta l_2^2$ $\theta_1 = \theta_1 + \Delta\theta_1^2$, $\theta_2 = \theta_2 + \Delta\theta_2^2$ and, so on, until $\Delta l_1^n$, $\Delta l_2^n$, $\Delta\theta_1^n$ and $\Delta\theta_2^n$ become sufficiently small, thereby obtaining $$\Delta l_1 = \sum_{i=1}^{n} \Delta l_1^i, \ \Delta l_2 = \sum_{i=1}^{n} \Delta l_1^i$$

$$\Delta\theta_1 = \sum_{i=1}^{n} \Delta\theta_1^i, \ \Delta\theta_2 = \sum_{i=1}^{n} \Delta\theta_2^i$$

as the structural errors.

The measuring paper 146 and the pen shown in FIG. 2 may be substituted by a combination of a digitizer and an associated stylus pen so that a point marked by the stylus pen can be input directly to a computer to thereby automate the measurement.

It is further possible to sub-divide the movable range of the robot 14 and apply the present method to each sub-division. In order to correct structural errors for some sub-divided area, structural errors measured in the corresponding sub-divided area must be used. In such case, the accuracy of structural error correction can be much improved although an data amount to be processed may be increased.

As described, according to the present invention, the robot coordinates system can be easily made coincident with an absolute coordinates system, resulting in that the structural errors of SCARA robot can be obtained easily. By controlling the robot by correcting these errors, it is possible to position the robot arm with high absolute accuracy.

What is claimed is:

1. A method of correcting structural error of a SCARA type robot having arms with two degrees-of-freedom in a horizontal plane, the method comprising the steps of:

obtaining an origin of a SCARA robot coordinate system coincident with an origin of an absolute coordinate system by only moving a first axis thereof;

setting a pair of points which are symmetrical with respect to a y axis to obtain the y axis of said SCARA robot coordinate system from said pair of points;

obtaining errors of arm lengths and arm mounting angles by measuring another pair of points in said robot coordinate system; and correcting said errors of arm lengths and arm mounting angles to exactly position said arms at a numerically instructed position.

2. The method claimed in claim 1, further comprising the step of determining intermediate points on a route of movement of said robot arms to the respective points so that a driving system of said robot is rotated in the same direction by a predetermined amount to thereby remove backlash thereof.

* * * * *